(12) United States Patent
Wittenberg et al.

(10) Patent No.: US 9,085,107 B2
(45) Date of Patent: Jul. 21, 2015

(54) TOOLING CONCEPTS FOR REDUCING SINK AND IMPROVING AS-MOLDED COSMETICS AND DRAWINGS

(71) Applicant: Apple Inc., Cupertino, CA (US)

(72) Inventors: Michael B. Wittenberg, Sunnyvale, CA (US); Miguel C. Christophy, San Francisco, CA (US); Daniel W. Jarvis, Sunnyvale, CA (US); Shayan Malek, San Jose, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 13/895,954

(22) Filed: May 16, 2013

(65) Prior Publication Data

US 2014/0339736 A1    Nov. 20, 2014

(51) Int. Cl.
*B29C 45/28*    (2006.01)
*B29C 45/76*    (2006.01)

(52) U.S. Cl.
CPC ......... *B29C 45/7613* (2013.01); *B29C 45/2806* (2013.01)

(58) Field of Classification Search
CPC .............. B29C 45/234; B29C 45/2806; B29C 2045/2882; B29C 45/28; B29C 45/2803
USPC .......... 425/563, 564, 566; 264/328.1
See application file for complete search history.

(56) References Cited

U.S. PATENT DOCUMENTS

| | | | | |
|---|---|---|---|---|
| 2,456,778 | A | * | 12/1948 | Gilchrist ................. 425/146 |
| 3,010,156 | A | * | 11/1961 | Smith .................... 425/146 |
| 3,241,191 | A | * | 3/1966 | Nouel .................... 425/563 |
| 3,482,283 | A | * | 12/1969 | Korf .................... 425/129.1 |
| 4,285,661 | A | * | 8/1981 | Yotsutsuji et al. ........... 425/563 |
| 4,289,468 | A | * | 9/1981 | von Holdt ................ 425/146 |
| 4,380,422 | A | * | 4/1983 | Von Holdt ................ 425/146 |
| 4,917,593 | A | * | 4/1990 | Gellert .................. 425/549 |
| 5,219,593 | A | * | 6/1993 | Schmidt et al. ........... 425/549 |
| 5,556,582 | A | | 9/1996 | Kazmer |
| 5,589,206 | A | | 12/1996 | Hepler |
| 5,846,466 | A | * | 12/1998 | Abe et al. ................. 264/259 |
| 6,558,605 | B1 | | 5/2003 | Wilson |
| 7,306,455 | B2 | | 12/2007 | Dewar et al. |

* cited by examiner

*Primary Examiner* — Jill Heitbrink
(74) *Attorney, Agent, or Firm* — Downey Brand LLP

(57) ABSTRACT

The described embodiments relate generally to improvements to injection molding equipment. More specifically, concepts for reducing sink and improving cosmetics of portions of injection molded parts in close proximity to gate areas of an injection mold are disclosed. A cold runner system is described in which molding material disposed in a mold cavity is separated from excess molding material in the runner system shortly after the mold is filled at a predetermined packing pressure.

13 Claims, 10 Drawing Sheets

TOOLING CONCEPTS FOR REDUCING SINK AND IMPROVING AS-MOLDED COSMETICS AND DRAWINGS

BACKGROUND

1. Technical Field

The described embodiments relate generally to improvements to injection molding equipment. More specifically, tooling concepts for reducing sink and improving cosmetics of injection molded parts are disclosed.

2. Related Art

Injection molded materials have a tendency to contract during solidification after an injection molding process. Contraction can generally be accommodated for by making a cavity of the injection mold correspondingly larger; however, asymmetric contraction can be much harder to accommodate. Accommodations for asymmetric contraction can include additional time consuming finishing operations to produce a cosmetically acceptable part. Asymmetric contraction can be caused by contraction of the plastic material into portions of the mold called gates and/or runners. Contraction of the plastic into the gates can cause sink on portions of the injection molded part opposite the gates.

Therefore, what is desired is a way to reduce or eliminate asymmetric sink near gate and runner portions of an injection molded part.

SUMMARY

This paper describes various embodiments that relate to tooling concepts for reducing sink and improving cosmetics of injection molded parts.

An injection mold for forming a molded structure is disclosed. The injection mold includes at least the following: a runner configured to guide a flow of molding material into a cavity at a gate area in accordance with a forward pressure exerted on the molding material; and a flow controller. The flow controller is disposed within the runner and configured to control the flow of the molding material into the cavity in accordance with a pressure differential between the forward pressure exerted on the molding material and a back pressure generated by an amount of molding material in the cavity. The flow controller includes at least the following: a body portion having a size and shape that cooperates with the runner to form a channel through which the molding material flows in response to the pressure differential; and a flow control portion integrally formed with the body portion, having a size and shape that cooperates with the runner to form a flow control region for separating the channel and the cavity. The pressure differential acting on the flow control portion regulates the flow of molding material into the cavity to prevent the formation of a sink formation in the molded structure.

In another embodiment an injection molding apparatus is disclosed. The injection mold includes at least the following: a runner configured to guide a flow of pressurized molten molding material into a cavity, the runner having a gate area disposed at an intersection of the runner and the cavity; and a pressure actuated flow controller. The pressure actuated flow controller includes a body portion disposed within the runner, and a flow control portion integrally formed with the body portion. The flow control portion is disposed substantially within the gate area of the runner. When a predetermined pressure is reached within the cavity, the pressurized molten material in the cavity exerts a force on the flow control portion of the flow controller that overcomes a force exerted by a supply pressure of the molten molding material in the runner. When the force exerted by the molten molding material within the cavity pushes the flow controller into a closed position against a sidewall of the gate area, the flow controller severs a connection between the molten molding material in the runner and the molten molding material in the cavity.

In yet another embodiment a method for forming an injection molded part is disclosed. The method includes at least the following steps: injecting pressurized molten molding material into a cavity of an injection mold through a runner until a predetermined pressure is reached in the cavity; and closing a path between the runner and the cavity. The path is closed with a flow controller disposed within the runner once the predetermined pressure is established in the cavity. The predetermined pressure within the cavity exerts a force on the flow controller that overcomes a force provided by pressurized molten molding material in the runner to move the flow controller axially within the runner from an open position to a closed position. In the open position the flow controller in cooperation with the runner defines a path between the flow controller and sidewalls of the runner along which the molten molding material flows into the cavity.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION OF SELECTED EMBODIMENTS

Figure 1:
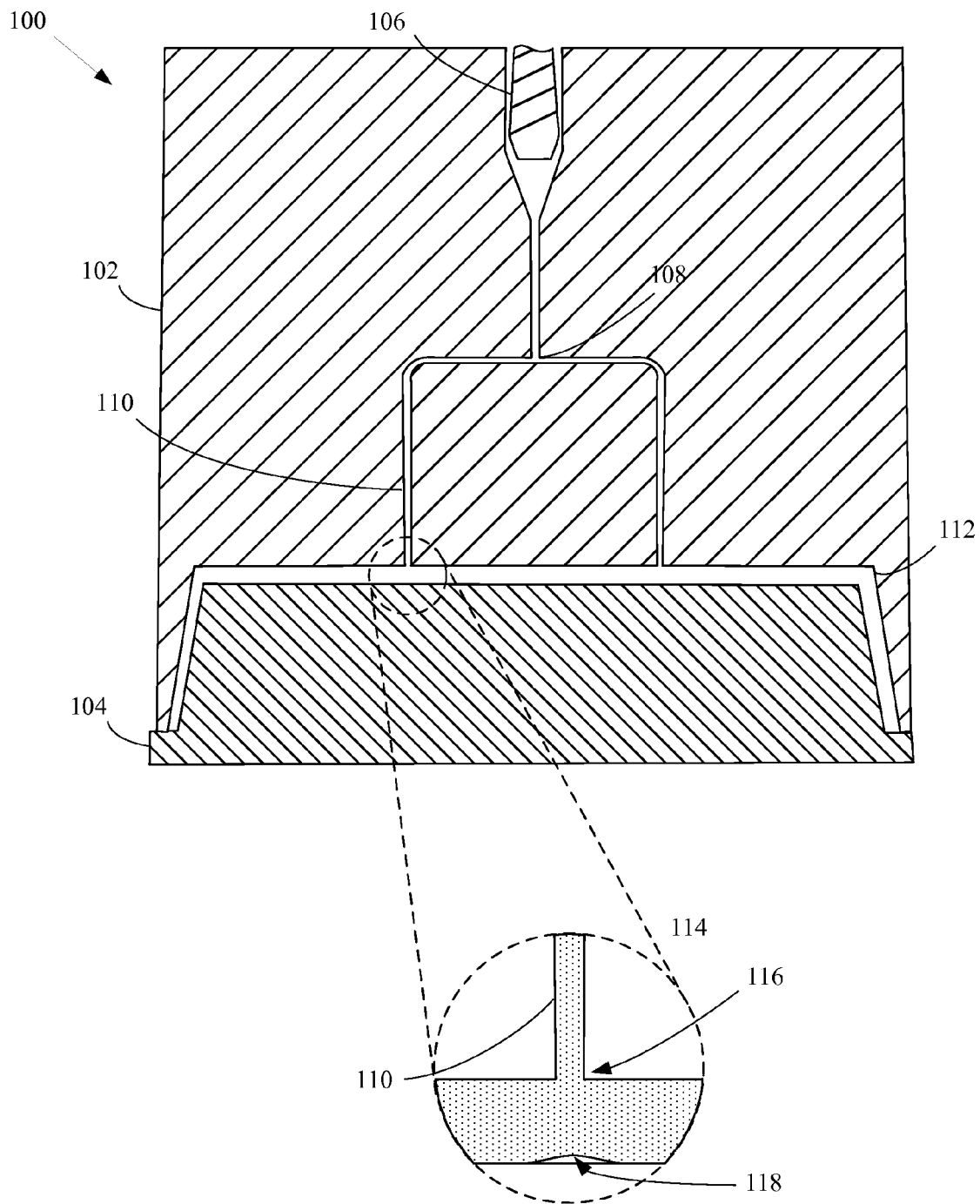
FIG. 1 shows cross-sectional view of an injection mold with a close up view of a cosmetic imperfection.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Injection molding processes typically involves two steps: melting an appropriate amount of molding material, and then injecting the melted material into a mold cavity having a shape in accordance with a finished part. The molding material can be made up of any number of polymers, including thermoplastics, thermosets and elastomers. For exemplary purposes only the molding material will be exemplified by plastic resin without implying any loss of generality. The melted plastic resin can be delivered from the heater to the mold cavity using multiple conduits that are disposed throughout the mold, to deliver plastic resin to various portions of the mold cavity. These conduits are typically referred to as runners in the injection molding industry. The opening leading from each runner to the mold cavity is referred to as a gate or gate area. Once the mold cavity has been filled, extra molten plastic material is typically trapped inside the runners and gate areas of the mold. In a cold runner system (one in which material within the runners are not kept at molten temperatures), as the mold cools and the part solidifies, so does the plastic material trapped in the runners and gates. When plastic resin cools a certain amount of contraction takes place. Given a sealed mold cavity having a substantially uniform cross-section, shrinkage of the plastic material tends to be substantially uniform across the part; however, because the material trapped in the runners and gate areas remains attached to the plastic part during cooling the uniformity of the part becomes variable, causing a certain amount of asymmetric shrinkage to occur in portions of the part in close proximity to the gates. This asymmetric shrinkage is commonly referred to as sink. Sink is quite common in portions of the part opposite gate areas, as the plastic that should be present along the surface tends to be pulled into nearby gate and runner structures during the plastic contraction. Since contraction of the plastic is typically centered about a center point of the plastic part, longer gate and runner structures tend to cause more severe cases of sink, as a center point of the plastic part tends to be displaced farther from the actual part.

One solution to the sink phenomenon is to separate the resin in the cavity from the resin in the gate area and runner structure shortly after completing the injection of the melted plastic resin into each cavity. In this way, plastic resin from the cavity is separated from the gate structure early enough that it is not pulled into the gate and runner structures during cooling and sink can be avoided. When the resin is separated along a surface of the plastic part, variations in cosmetic surfaces near the gates can also be avoided, as portions of the part in close proximity to gate regions can have a similar appearance as the rest of the part. Separation of resin in the cavity from resin in the runners and gate regions can be accomplished in a number of ways.

In one embodiment a valve pin can be situated within the runner, close to the gate structure. The valve pin can have a first position that allows molten plastic resin to flow past it and a second position in which the liquefied plastic resin in the runner and gate areas is physically separated from the plastic resin injected into the cavity. In this way, the valve pin operates as a flow controller for the molten molding material entering the cavity. The valve pin can be configured with various geometries that are suited for separating the cavity from the gate and runner structures. In some implementation the valve pin can be mechanically, electrically or pneumatically actuated between positions by a discrete actuation system. This implementation allows for shutoff of resin supply to the cavity at any time. In another implementation, the valve pin can be actuated when a pressure of the plastic resin within the mold cavity reaches a predefined pressure, often referred to as a packing pressure. The pressurized molten plastic within the cavity can be configured to exert pressure on the valve pin, causing the valve pin to press against a portion of the sidewalls defining the gate area into the second position. In this way, a design of the mold can be simplified, as the valve pin doesn't require an actuator for modulating a position of the valve pin. Furthermore, another advantage of such a configuration is that it allows the mold cavity to be consistently pressurized at the packing pressure before the valve pin prevents passage of the molten plastic.

In another embodiment an intervening slider can be configured to cleave all but a small vestige from the cooling plastic part situated in the cavity of the mold. The slider can be situated within the mold and be configured to sever molten plastic within the runner at a position that is close to the plastic resin cooling in the mold cavity. By minimizing the amount of material left attached to the plastic material in the cavity, sink can be substantially eliminated. When there are a number of closely spaced gates a single slider can be configured to concurrently sever a number of runners. In this way a number of gate and runner structures can be severed from the cavity by adding a single structure to the mold. In some configurations, a pressure within the mold cavity can be used to actuate the slider.

These and other embodiments are discussed below with reference to FIGS. 1-6; however, those skilled in the art will readily appreciate that the detailed description given herein with respect to these figures is for explanatory purposes only and should not be construed as limiting.

FIG. 1 shows one configuration of an injection mold 100. Injection mold 100 includes two sides: a cavity side 102 and a core side 104. The injection molding process includes melting and compressing plastic pellets with ram 106. In addition to melting and compressing the plastic pellets, ram 106 is also operable to drive the molten plastic forward into the mold, thereby keeping it flowing through cavity side 102. Once the molten plastic passes ram 106, it is pushed farther into the mold by pressurized molten plastic behind it. The path the plastic takes through the injection mold is commonly referred to in the industry as a sprue. The sprue can be divided into a number of runners at position 108, including runner 110, that distribute the molten plastic to various positions in mold cavity 112 from position 108 of the sprue. The runner structure can allow the molten plastic to evenly fill injection mold cavity 112. In some embodiments a series of runners can be configured to distribute plastic to each of a number of cavities, within the injection mold. Once cavity 112 is filled with molten plastic at a predefined pressure, commonly referred to as a packing pressure, the plastic is allowed to cool and at least partially solidify. Close-up view 114 shows gate structure 116 of the injection mold. Gate structure 116 is where the molten plastic is introduced into the mold cavity. A phenomenon known as sink can occur as a result of material in mold cavity 112 being sucked up into runner 110 through gate structure 116 during solidification of the molten plastic. As a result of a portion of the plastic being sucked into runner 110, shrinkage of the plastic during cooling is asymmetric, causing sink portion 118 to form along a surface of the part. Such an imperfection can cause serious cosmetic imperfections in a finished part, thereby requiring finishing operations on the injection molded part to smooth out the imperfections.

Figure 2A:
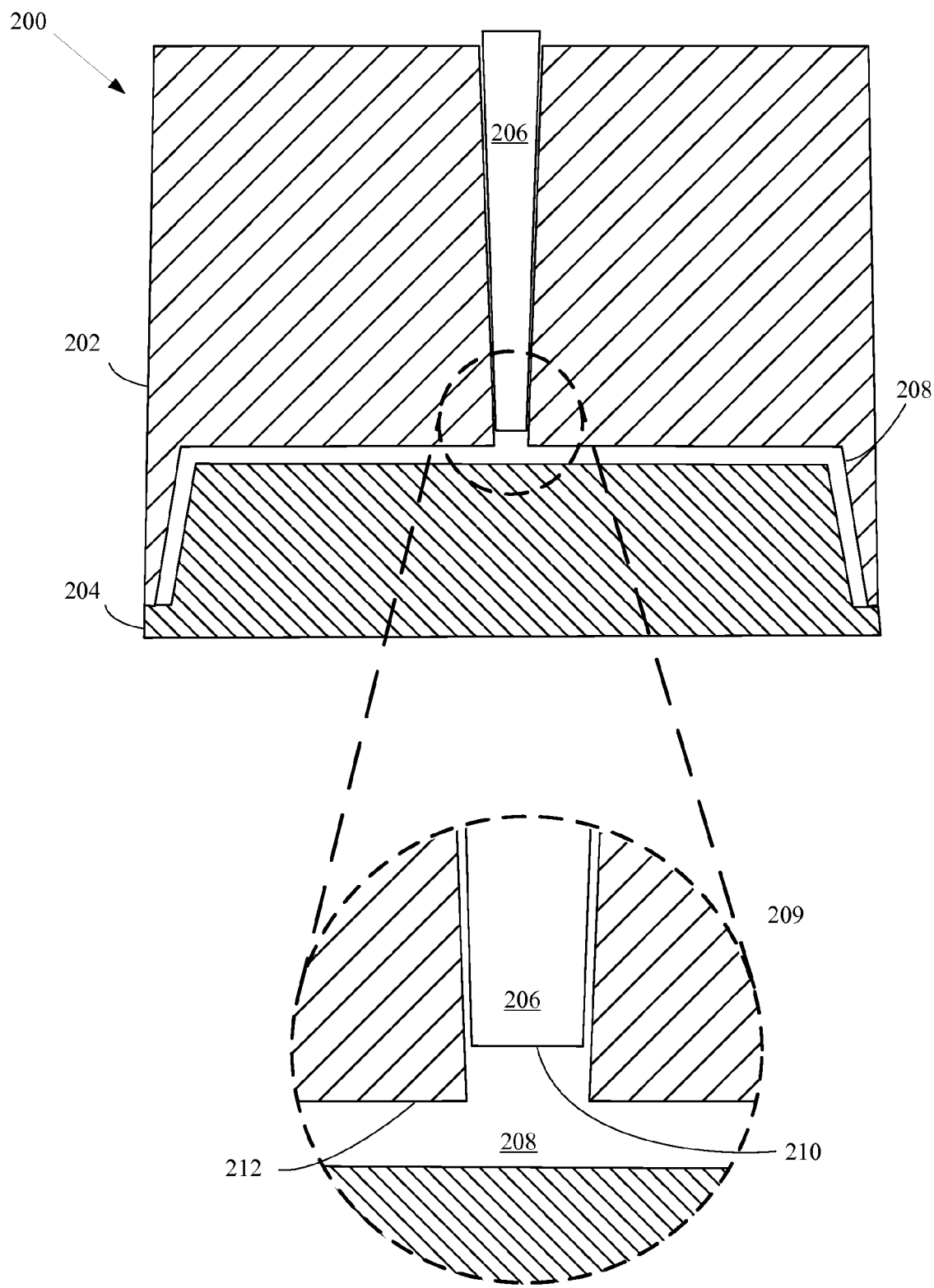
FIGS. 2A-2B show cross-sectional views of a valve pin disposed in a runner and gate area of an injection mold.

FIG. 2A shows one solution to asymmetric shrinkage in which valve pin 206 is positioned in close proximity to a gate structure of injection mold 200. A valve pin can have a geometry corresponding to a cone or frustum of a cone with a wider base of the cone disposed away from cavity 208 of injection mold 200. Valve pin 206 is depicted in FIG. 2A and has at least two positions: an open position, and a closed position. In the open position, as depicted in close up view 209, molten plastic can move past either side of valve pin 206. When cavity 208 is filled to a packing pressure, valve pin 206 can assume the closed position. In its closed position, valve pin 206 can sever the cooling molten plastic in cavity 208 from any plastic within the gate structure. In some embodiments valve pin 206 can be formed so that in a closed position, valve pin face 210 can be substantially flush with cavity face 212 of cavity 208. Such a configuration can prevent any vestige from being formed on the finished part near the gate structure. Valve pin 202 can be actuated between the closed and open positions in a number of ways.

Figure 2B:
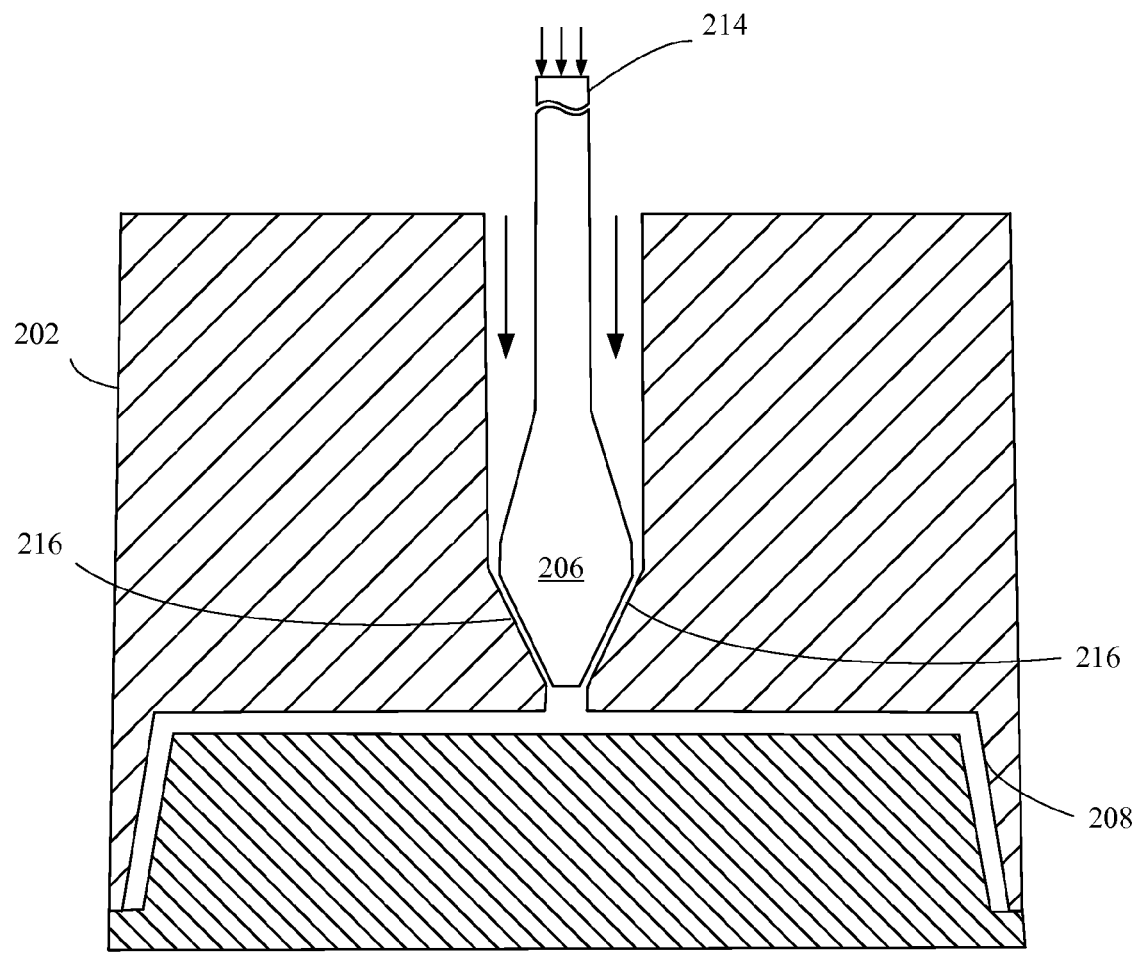

FIG. 2B shows one way in which valve pin 206 can be actuated. The depiction in FIG. 2B shows how a portion of valve pin 206 can be coupled to an actuating element 214. Actuating element 214 can be attached to valve pin 206 anywhere along a length of valve pin 206. When actuating element 214 is disposed near a rear portion of valve pin 206, actuating element 214 can be positioned near an exterior portion of cavity side 202, thereby simplifying a design of actuating element 214. Actuating element 214 can be implemented in a number of different configurations and powered electrically, hydraulic and/or pneumatically. In one embodiment, actuating element 214 can be an arm extending through a sidewall of the runner that is mechanically coupled to valve pin 206 and around which molten plastic can flow. In a first position molten plastic can flow easily around valve pin 206 and in a second position valve pin 202 can be pushed up against surface 216 of cavity side 202, effectively severing a connection between molten plastic in the cavity and molten plastic trapped in the runner system. In addition to providing a means for transitioning valve pin 202 between positions, actuating element 214 can also be configured to constrain valve pin 202 within the runner, thereby helping to properly position it throughout an injection molding process.

Figure 3A:
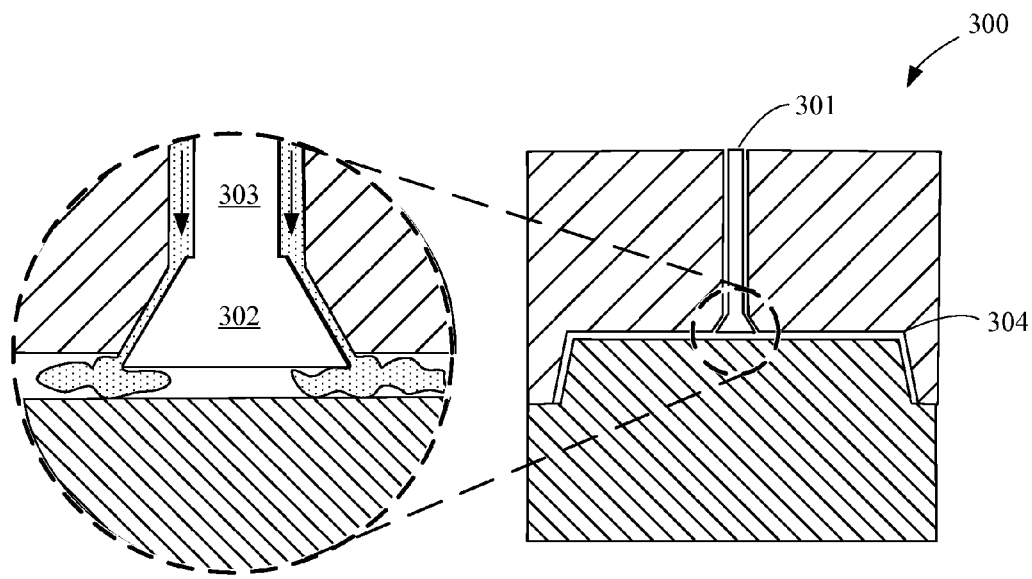
FIGS. 3A-3B show cross-sectional views of a reverse valve pin disposed in a runner and gate area of an injection mold.
Figure 3B:
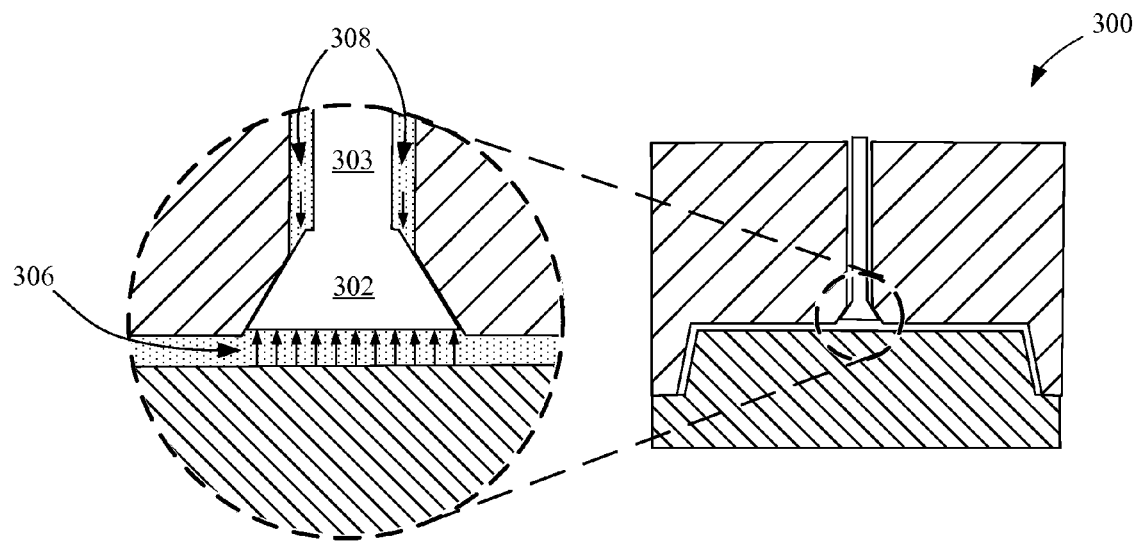

FIGS. 3A-3B illustrate injection mold 300 having a reverse valve pin configuration. In the reverse valve pin configuration a supply pressure or forward pressure of molten plastic keeps reverse valve pin 301 in an open configuration during an injection molding operation. Reverse valve pin 301 includes a flow control portion 302 and a body portion 303. Flow control portion 302 can have a cone shaped geometry and body portion 303 can have a cylindrical geometry. A broad end of flow control portion 302 can be disposed towards cavity 304 and a narrow end of cone shaped flow control portion 302 can be integrally formed with body portion 303. FIG. 3A depicts molten plastic passing along either side of reverse valve pin 301. Due to the shape of flow control portion 302 incoming molten plastic is driven at an angle with respect to its original direction of travel in the runner. Such a change in direction can advantageously reduce blushing on the finished part as the incoming molten plastic hits an opposing side of cavity 304 at a relatively lower speed. As mold cavity 304 fills with molten plastic, an amount of back pressure builds up within cavity 304. The amount of built up back pressure corresponds to the amount of molten plastic that has been injected into cavity 304.

Injection mold 300 can have a packing pressure 306 at which injection mold 300 is configured to most successfully operate. By carefully designing the geometry of reverse valve pin 302, packing pressure 306 within cavity 304 can create a negative pressure differential between the plastic in the cavity and the plastic in the runner just great enough to push reverse valve pin 302 into a closed position by overcoming supply pressure 308, as depicted in FIG. 3B. In some configurations a cavity facing surface of flow control portion 302 can be substantially coplanar with a wall defining cavity 304 when reverse valve pin 301 is in a closed position. In this way reverse valve pin 301 can be operative as a molten plastic flow controller for injection mold 300. Such a configuration leaves minimal traces on a cosmetic surface of the finished part corresponding to the intersection of the runner with cavity 304. In an alternative embodiment, suction can be used to substantially reduce pressure in the runner system of mold 300 once a predetermined amount of molten plastic has been introduced into the system. In some embodiments the suction can be great enough to substantially clear molten plastic remaining outside of the mold cavity 304. In this way, reverse valve pin 302 is sucked into a closed position and the runner system is substantially cleared of molten plastic between injection molding operations. It should be noted that the packing pressure can be an ideal pressure for the molten plastic within cavity 304 to be at just prior to cooling of the plastic within cavity 304. Cooling can be accomplished passively or actively. In some embodiments mold 300 can be water cooled, to allow the molten plastic within mold 300 to quickly solidify.

Figure 3C:
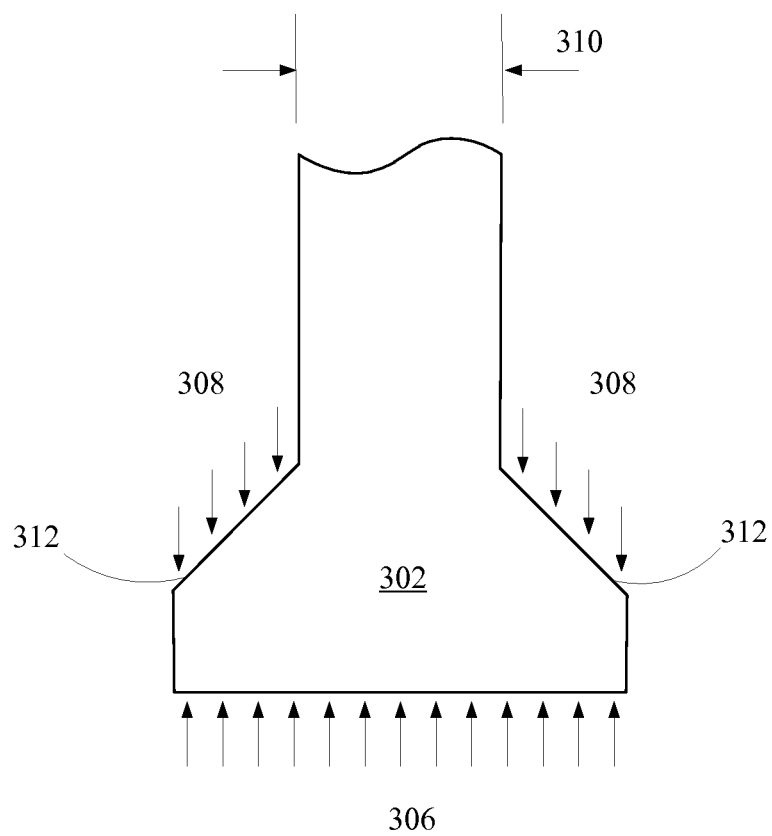
FIG. 3C shows how supply pressure is balanced against packing pressure with a reverse valve pin configuration.

FIG. 3C shows more precisely how a supply pressure 308 of incoming molten plastic balances against packing pressure 306 being provided by the molten plastic within cavity 304. This balance can be adjusted by changing geometry of various portions of reverse valve pin 302. For example, a diameter 310 of reverse valve pin 302 can be increase, thereby reducing the area across which supply pressure 308 can act. A slope of surfaces 312 can also be adjusted to change the amount of force supply pressure 308 can exert upon surfaces 312. These types of adjustments can be utilized to fine tune the actuation of reverse valve pin 302 to coincide with an ideal packing pressure 306 for any given part. In some embodiments, reverse valve pin 302 can be configured to be biased towards a closed position by a spring. In such an embodiment, reverse valve pin 302 can be configured to be closed by the spring both before and after molten molding material is provided at a supply pressure great enough to overcome the force provided by the spring. Consequently, this allows for a lower pressure within the mold cavity to actuate reverse valve pin 302 to a closed position, since the spring can assist the mold cavity pressure in pushing reverse valve pin 302 against sidewalls in the gate region. It should be noted that in other embodiments the spring can be configured to be biased towards an open position by the spring.

Figure 4A:
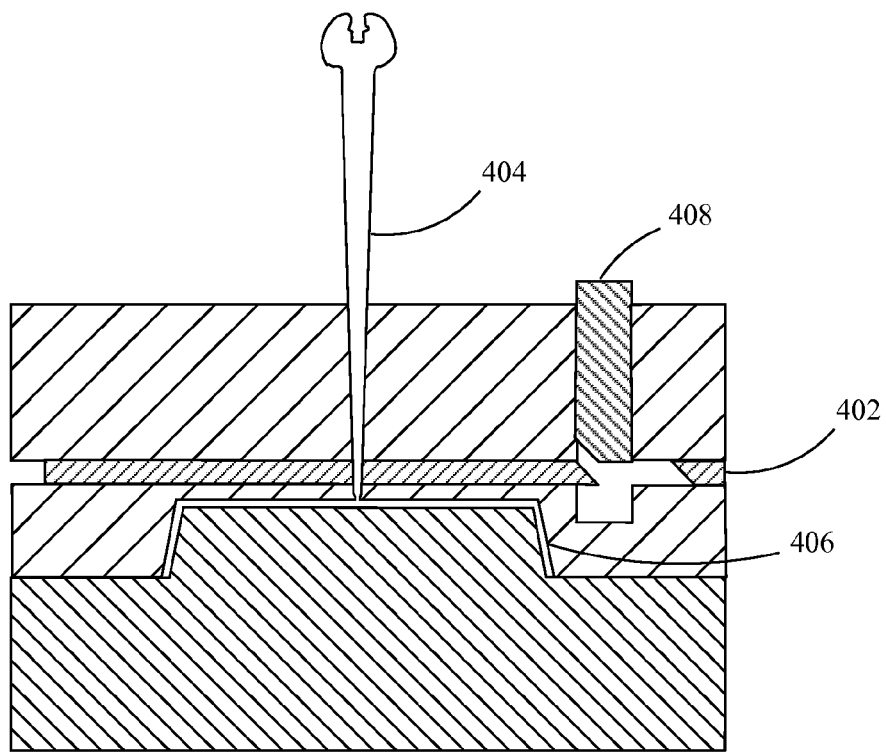
FIGS. 4A-4B show an injection mold having a slider configured to sever a connection between molten molding material disposed in a mold cavity and molten molding material disposed in a runner.
Figure 4B:
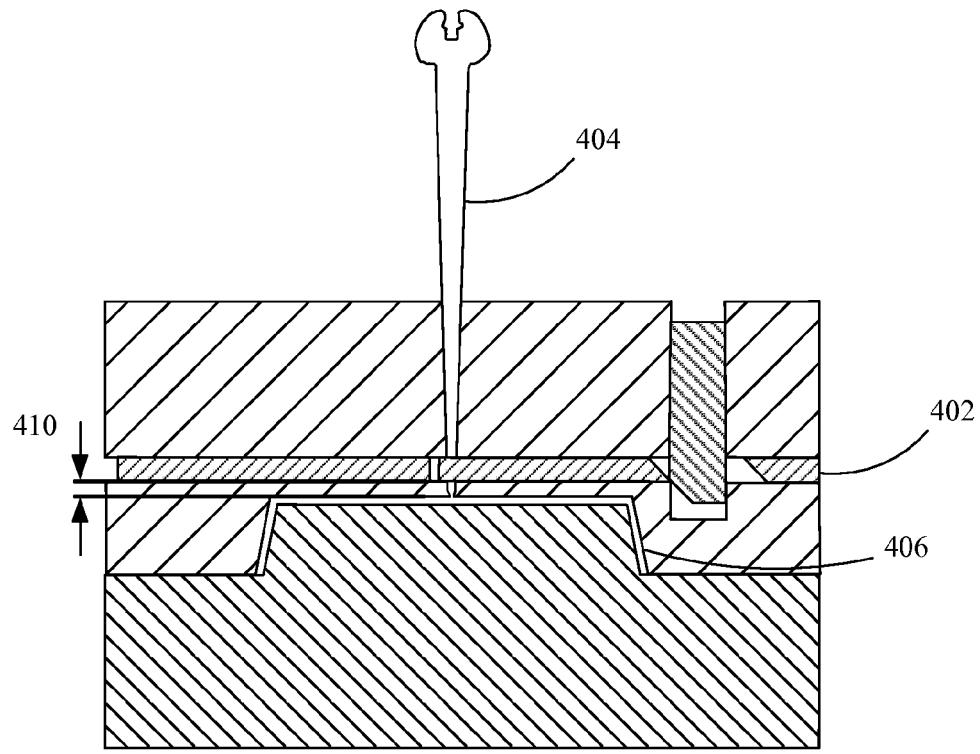
Figure 4C:
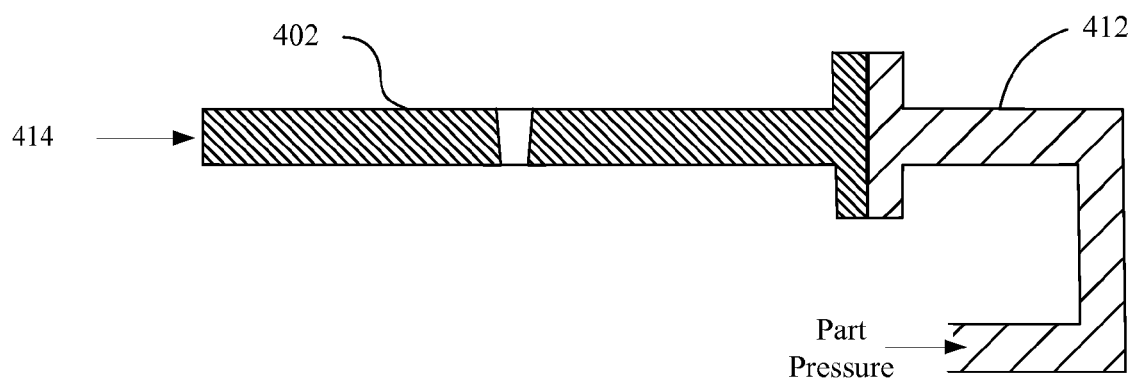
FIG. 4C shows one way the slider depicted in FIGS. 4A and 4B can be configured to be actuated by pressure supplied by molten molding material within a mold cavity.

FIG. 4A shows an illustration of a slider configured to terminate a connection between molten plastic in a mold cavity and excess plastic left within the runner system. Slider 402 can sever a connection between sprue 404 and molten plastic disposed within mold cavity 406. Actuator 408 can actuate slider 402. Actuator 408 interacts with slider 402 to move slider 402 to the left as illustrated in FIG. 4B. Mold thickness 410 between slider 402 and cavity 406 can be minimized, thereby leaving a small portion of excess material attached to the molten plastic in cavity 406. By minimizing excess material left about the gate region a likelihood of causing sink in an opposing side of the finished part can be greatly reduced. FIG. 4C shows an alternative way of actuating slider 402. Pressure from the molten plastic can be used to push against slider 402. For example, cavity 406 can include pressure vents for allowing air to escape from cavity 406 as cavity 406 is filled with molten plastic. At least some of the air vented from the cavity can be directed into pathway 412, which can be configured to actuate slider 402. When pressure provided by the molten plastic displacing air in the cavity exceeds a spring based or supply pressure based force 414 acting on an opposite side of slider 402, slider 402 closes and terminates a connection between sprue 404 and molten plastic within cavity 406.

Figure 5A:
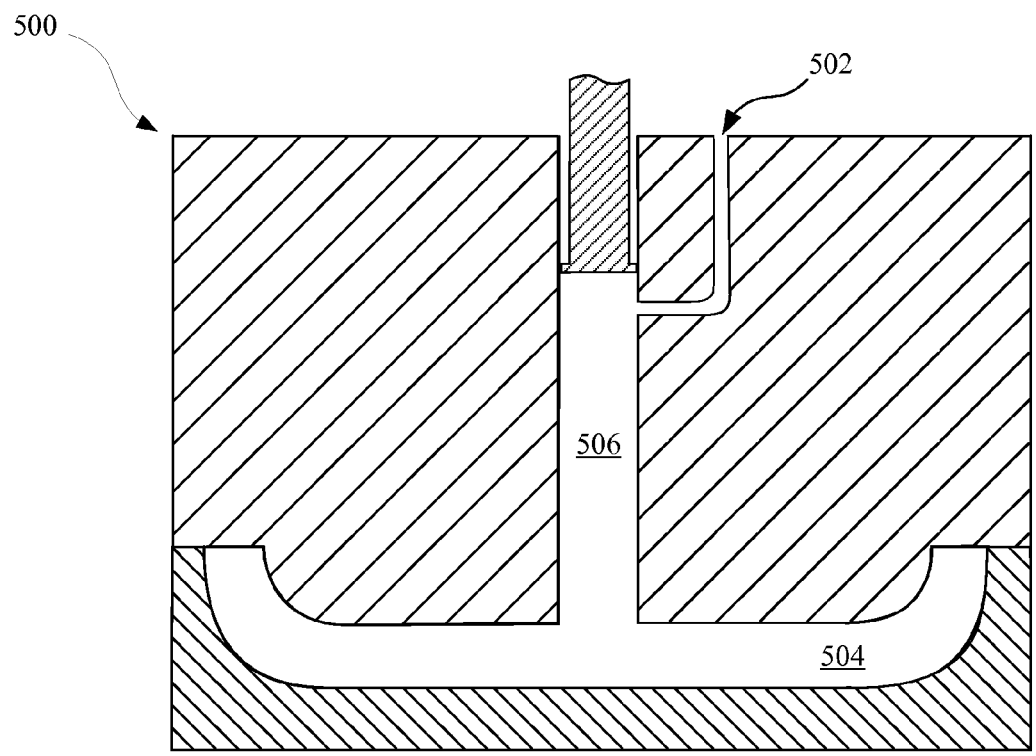
FIG. 5A shows a mold having a runner structure connected to a mold cavity by a conduit configured with a piston.
Figure 5B:
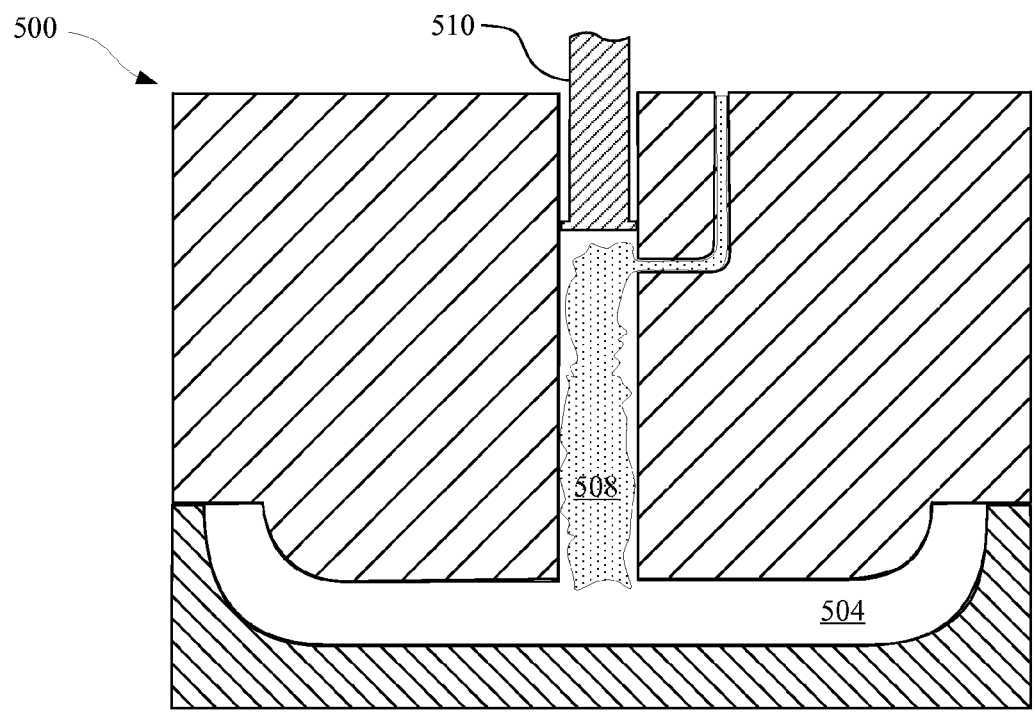
FIG. 5B shows how molten molding material can be injected in the conduit of the mold depicted in FIG. 5A.
Figure 5C:
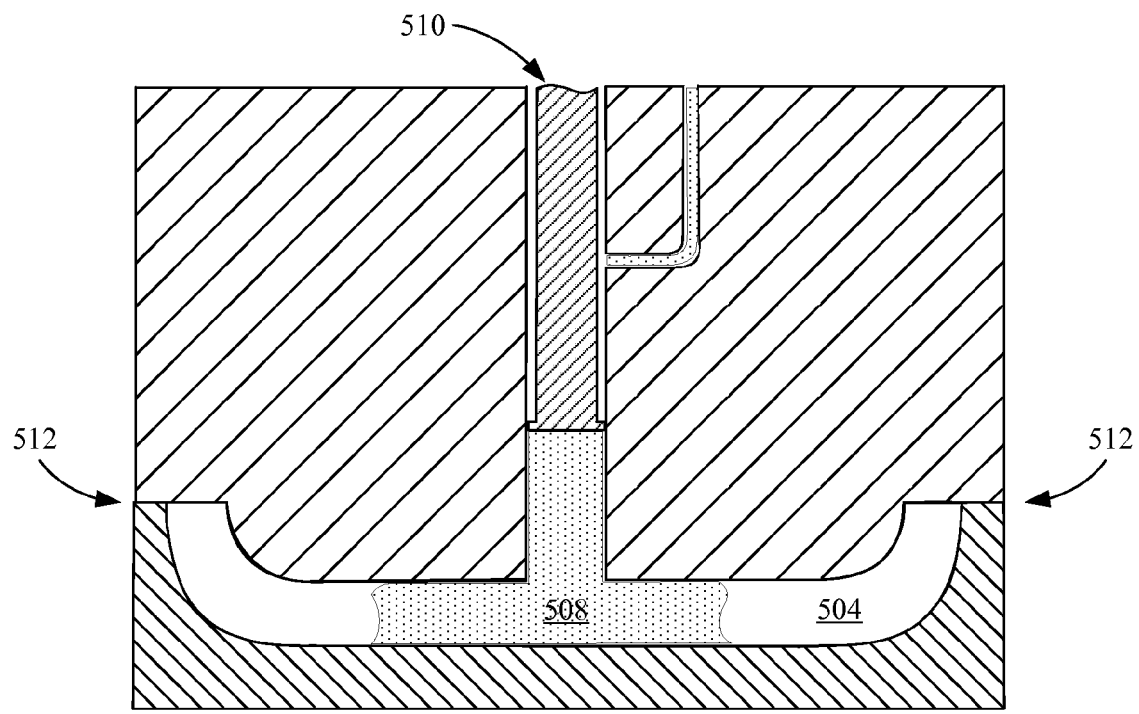
FIG. 5C shows how the piston of the mold depicted in FIGS. 5A and 5B can be used to push the molten molding material out of the conduit and into the mold cavity.
Figure 5D:
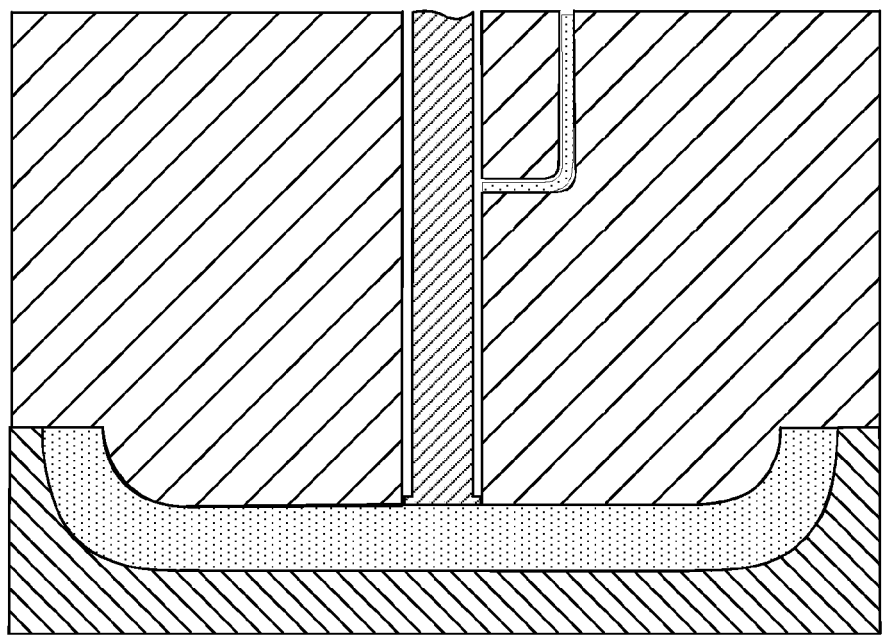
FIG. 5D shows how a front face portion of the piston of the mold depicted in FIGS. 5A-5C can push the molten molding material into the mold cavity until the front face reaches the mold cavity.

FIGS. 5A-5D show a series of illustrations showing another configuration for injecting molten plastic into a mold cavity. FIG. 5A shows mold 500 having a runner 502 for supplying molten plastic to cavity 504. Runner 502 can be configured to deposit the molten plastic into conduit 506. In FIG. 5B, once a predetermined amount of molten plastic 508 is delivered by runner 502 into conduit 506, piston 510 can push molten plastic 508 into cavity 504. As piston 510 passes runner 502, molten plastic in runner 502 is severed from molten plastic 508. In FIG. 5C piston 510 is shown partially depressed as it pushes molten plastic 508 into cavity 504. As molten plastic 508 is pushed into cavity 504, air trapped within cavity 504 can escape cavity 504 via small vent holes etched along parting lines 512. FIG. 5D shows how once piston 510 has pushed molten plastic 508 fully into cavity 504 it is positioned along a wall of cavity 504. A front portion of piston 510 can be shaped to match a surface defining cavity 504. In this way, the finished part can have little or no tool marks along the portion of the finished part that is in contact with piston 510 during the cooling process. It should be noted that another advantage of such a configuration is that because the piston leaves little or no marks or sink on an opposing portion of the finished part, a size of the conduit can be larger than a typical runner would be. A larger gate area can reduce problems with blushing on the finished part, as narrow gate areas can lead to early solidification of the molten plastic. Early solidification of the molten plastic prevents the plastic from fully conforming to the mold cavity, thereby causing blushing/defects on various portions of the finished part.

Figure 6:
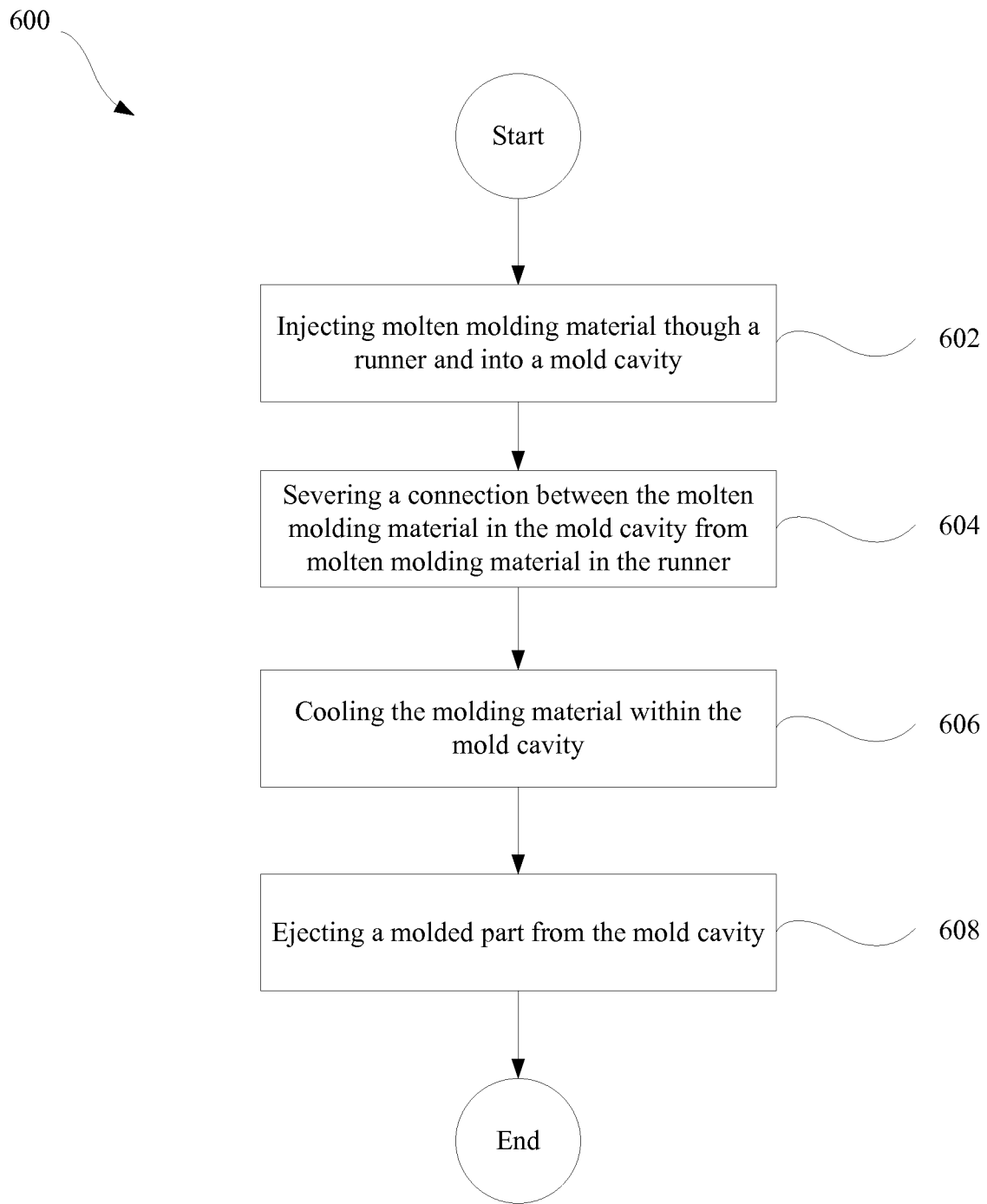
FIG. 6 shows a flow chart describing a method for controlling the flow of molten molding material into a mold cavity.

FIG. 6 shows a flow chart 600 describing a method for controlling the flow of molten molding material into a mold cavity. In a first step 602 a shot of molten molding material is injected into a runner. The shot of molten molding material can be sufficient to fill both a mold cavity and the runner. The runner defines a path along which the molten molding material travels to the cavity. The shot of molten molding material can be provided at a supply pressure sufficient to push the material into the cavity at a packing pressure. In step 604 a flow controller can be configured to sever a connection between the molding material in the mold cavity and the molding material in the runner, prior to the molding material solidifying. In some embodiments the flow controller can be configured to sever the connection along an interface between the runner and the mold cavity. In such an embodiment the finished part can have a blemish free surface at the portion where the material is severed. At step 606 the molding material within the mold cavity is cooled enough so that a resulting part is at least partially solidified. At step 608, the resulting part can be ejected from the mold cavity. Since the part is already separated from the solidified molding material within the runner, the resulting part can be ejected separately or concurrently with solidified material disposed in the runner.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An injection mold for forming a molded structure, comprising:
   a runner configured to guide a flow of molding material into a cavity at a gate area in accordance with a forward pressure exerted on the molding material; and
   a flow controller passing through the gate area of the runner proximate the cavity and configured to transition between an open position in which the molding material can pass into the cavity and a closed position in which the molding material cannot pass into the cavity in accordance with a pressure differential between the forward pressure exerted on the molding material and a back pressure generated by an amount of molding material in the cavity, the flow controller comprising:
      a slider defining an opening aligned with the gate area of the runner when the slider is in the open position, the slider comprising a distal end configured to receive a force generated by pressurized air exiting the cavity by way of a number of pressure vents,
   wherein once the back pressure within the cavity reaches a predetermined threshold the force acting upon the distal end of the slider shifts the slider in a direction substantially perpendicular to the flow of molding material to reach a closed position in which the opening is no longer aligned with the gate area.

2. The injection mold as recited in claim 1, wherein the slider defines a number of openings that control the flow of molding material into the cavity through a number of runners.

3. The injection mold as recited in claim 1, wherein the predetermined threshold of the back pressure corresponds to a packing pressure of the molding material within the cavity being reached, the packing pressure being a pressure at which the injection mold is designed to operate.

4. The injection mold as recited in claim 1, wherein a spring is configured to bias the slider of the flow controller towards the open position until the force supplied by the pressurized air overcomes the biasing exerted by the spring.

5. An injection molding apparatus, comprising:
a runner configured to guide a flow of pressurized molten molding material into a cavity, the runner comprising a gate area disposed at an end of the runner that intersects the cavity; and
a pressure actuated flow controller, comprising:
a slider that passes through the gate area of the runner and defines an opening through which the flow of pressurized molten material passes into the cavity when the slider is in an open position, the slider comprising a first end configured to receive a pneumatic force from pressurized air vented out of the cavity as the pressurized molten molding material fills the cavity;
wherein when a predetermined pressure is reached within the cavity, the pneumatic force transitions the slider to a closed position, causing the opening to shift away from the gate area so that a connection between the molten molding material in the runner and the molten molding material in the cavity is severed.

6. The injection molding apparatus as recited in claim 5, wherein when the flow controller transitions to the closed position, a cavity-facing surface of the slider leaves only a minimal amount of material extending outside the cavity and into the gate area, insufficient to generate a sink condition on an opposing surface of a molded structure formed within the cavity.

7. The injection molding apparatus as recited in claim 5, wherein the molten molding material is thermoplastic material.

8. The injection molding apparatus as recited in claim 7, wherein the flow controller is mechanically constrained by a spring that biases the flow controller towards the open position.

9. The injection molding apparatus as recited in claim 5, wherein the slider transitions between the open and closed positions in a direction substantially perpendicular to the flow of pressurized molten molding material in the runner.

10. A method for forming an injection molded part, the method comprising:
injecting pressurized molten molding material into a cavity of an injection mold through a runner until a predetermined pressure is reached in the cavity; and
closing a path between the runner and the cavity with a slider by shifting an opening defined by the slider away from a gate area of the runner leading into the cavity once the predetermined pressure is established in the cavity,
wherein the predetermined pressure within the cavity pressurizes air exiting the cavity, the pressurized air being directed towards one end of the slider to exert a force upon the slider that moves the slider from an open position to a closed position, and
wherein in the open position the opening defined by the slider in cooperation with the runner defines a path along which the molten molding material flows into the cavity.

11. The method as recited in claim 10, wherein in the closed position the slider completely cuts off the flow of pressurized molten molding material into the cavity.

12. The method as recited in claim 11, wherein a spring coupled directly to the slider biases the slider towards the open position.

13. The method as recited in claim 10, further comprising:
allowing both the molten molding material disposed within the cavity and the molten molding material within the runner to cool after the path is closed.

* * * * *